United States Patent
Izaki (10) Patent No.: US 9,342,261 B2
(45) Date of Patent: May 17, 2016

(54) FUNCTION EXECUTION DEVICE

(71) Applicant: Brother Kogyo Kabushiki Kaisha, Nagoya-shi, Aichi-ken (JP)

(72) Inventor: Takeshi Izaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/661,385

(22) Filed: Mar. 18, 2015

(65) Prior Publication Data

US 2015/0277819 A1    Oct. 1, 2015

(30) Foreign Application Priority Data

Mar. 28, 2014  (JP) ................. 2014-068171

(51) Int. Cl.
*G06F 15/00* (2006.01)
*G06F 3/12* (2006.01)

(52) U.S. Cl.
CPC ............ *G06F 3/1236* (2013.01); *G06F 3/1204* (2013.01); *G06F 3/1226* (2013.01); *G06F 3/1285* (2013.01); *G06F 3/1292* (2013.01)

(58) Field of Classification Search
CPC .............................. G06F 3/1236; G06F 3/1285
USPC ....................................................... 358/1.15
See application file for complete search history.

(56) References Cited

U.S. PATENT DOCUMENTS

2010/0067406 A1  3/2010 Suzuki
2014/0063542 A1* 3/2014 Aoki .................... G06F 3/1296
                                                      358/1.15

FOREIGN PATENT DOCUMENTS

JP  2002-305521 A  10/2002
JP  2010-074334 A   4/2010
JP  2012-175452 A   9/2012

OTHER PUBLICATIONS

Wi-Fi Alliance Technical Committee P2P Task Group, "Wi-Fi Peer-to-Peer (P2P) Technical Specification", Version 1.1, pp. 1-159, released Oct. 4, 2010.

* cited by examiner

*Primary Examiner* — Saeid Ebrahimi Dehkordy
(74) *Attorney, Agent, or Firm* — Banner & Witcoff, Ltd.

(57) ABSTRACT

A function execution device may receive a request signal from a terminal device; send a response signal in response to the request signal to the terminal device; receive a first signal including function information indicating a first specific function from the terminal device after having sent the response signal; determine whether the function execution device is capable of executing the first specific function; and cause an output unit of the function execution device to output a first notice in a case where it is determined that the function execution device is capable of executing the first specific function, and not to output the first notice in a case where it is determined that the function execution device is not capable of executing the first specific function.

10 Claims, 7 Drawing Sheets

FUNCTION EXECUTION DEVICE

CROSS-REFERENCE TO RELATED APPLICATIONS

This application claims priority to Japanese Patent Application No. 2014-068171, filed on Mar. 28, 2014, the contents of which are hereby incorporated by reference into the present application.

TECHNICAL FIELD

The present specification discloses a function execution device for executing communication with a terminal device.

DESCRIPTION OF RELATED ART

A technique for connecting a multi-function device to an access point is known. The multi-function device searches the neighborhood for an access point that establishes a wireless network. As a result, the multi-function device receives an SSID from the access point. The multi-function device causes a display unit of the multi-function device to display a list of received SSIDs. When a user selects a target SSID, the multi-function device executes connection to the access point having the selected target SSID.

SUMMARY

Based on the foregoing technique, it is difficult to identify an access point corresponding to each SSID included in the list of SSIDs from among neighboring access points.

When wireless communication is executed by using a terminal device, it may be necessary to identify a communication target device.

The present specification provides a technique by which a function execution device may be easily identified on a terminal device.

The specification discloses a function execution device comprising a processor and a memory storing computer-readable instructions therein. The computer-readable instructions, when executed by the processor, may cause the function execution device to execute: receiving a request signal from a terminal device; sending a response signal in response to the request signal to the terminal device; receiving a first signal from the terminal device, the first signal including function information indicating a first specific function; determining whether the function execution device is capable of executing the first specific function indicated by the function information included in the received first signal; and causing an output unit of the function execution device to output a first notice indicating that the function execution device is capable of executing the first specific function in a case where it is determined that the function execution device is capable of executing the first specific function, and not to output the first notice in a case where it is determined that the function execution device is not capable of executing the first specific function.

In addition, a control method and a computer program that accomplish the foregoing function execution device, and a non-transitory computer-readable recording medium that stores the computer program are new and useful. Moreover, the foregoing terminal device, a control method and computer program that accomplish the terminal device, and a non-transitory computer-readable recording medium that stores the computer program that accomplish the foregoing function execution device are new and useful.

DETAILED DESCRIPTION (Configuration of Communication System 2)

Figure 1:
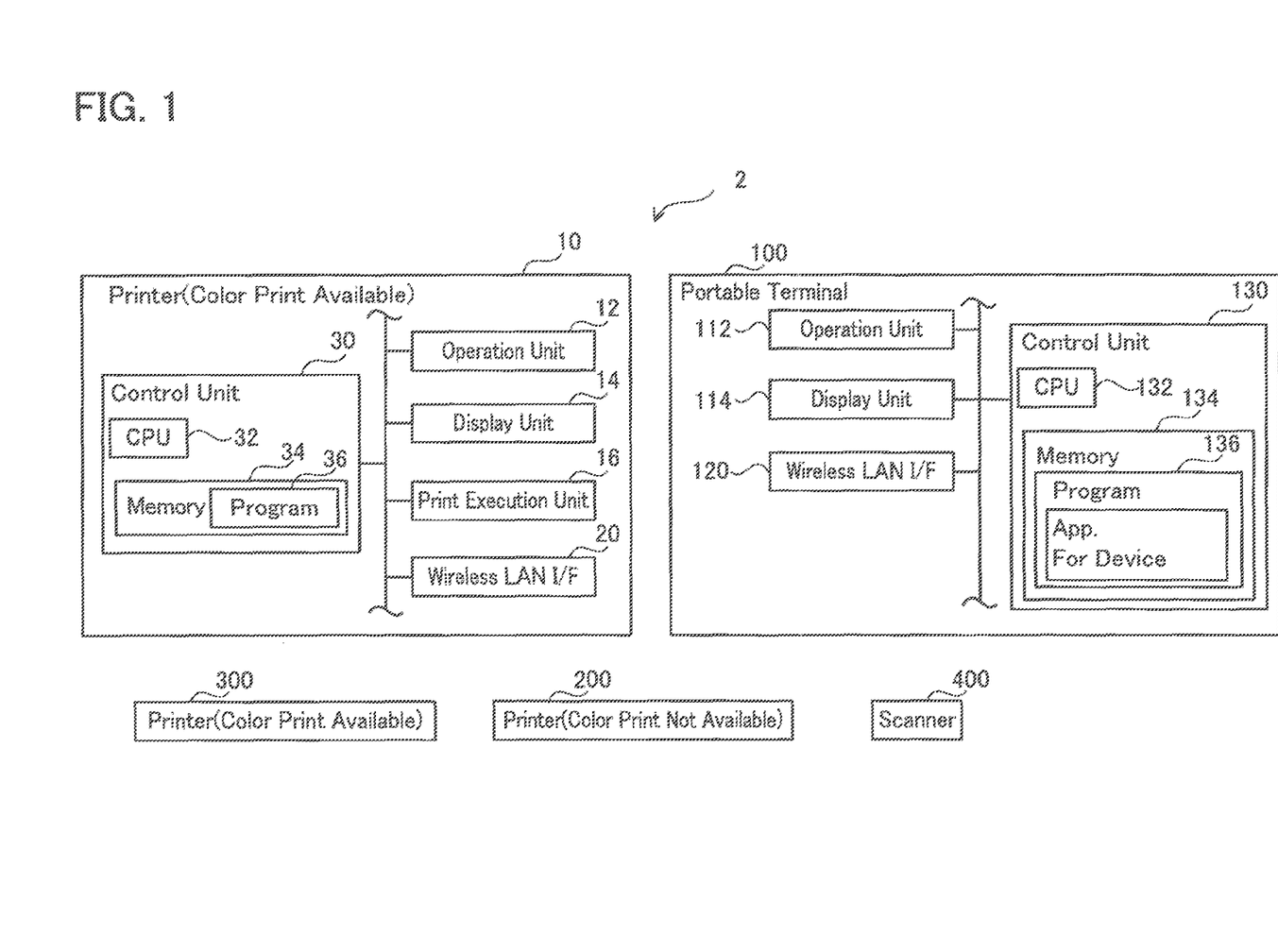
FIG. 1 shows a configuration of a communication system.

As shown in FIG. 1, a communication system 2 includes printers 10, 200, and 300, a scanner 400, and a portable terminal 100. The printers 10, 200, and 300 are disposed in a large site (for example, an event site, a factory, or an office) so that they are installed apart from each other. A user of the portable terminal 100 can move with it in the site.

(Configuration of Printer 10)

The printer 10 is a peripheral device that can execute a print function (the printer 10 is for example, a peripheral device of the portable terminal 100). The printer 10 includes an operation unit 12, a display unit 14, a print execution unit 16, a wireless LAN interface (hereinafter the interface is abbreviated as the "I/F") 20, and a control unit 30. The individual units 12 to 30 are connected to a bus line (of which reference numeral is omitted).

The operation unit 12 is provided with a plurality of keys. When the user operates the operation unit 12, the user can give a variety of instructions to the printer 10. The display unit 14 is a display unit that displays a variety of information. The print execution unit 16 is a print mechanism corresponding to an ink jet system, a laser system, or the like. The print execution unit 16 can execute both a color print function and a monochrome print function.

The wireless LAN I/F 20 is an interface through which Wi-Fi communication is executed according to a Wi-Fi system. The Wi-Fi system is a wireless communication system that executes wireless communication according to, for example, the Institute of Electrical and Electronics Engineers, Inc. (IEEE) 802.11 standard and its derivative standards (for example, 802.11a, 11b, 11g, 11n, and so forth). The control unit 30 can execute the Wi-Fi communication through the wireless LAN I/F 20. More specifically, the control unit 30 can execute the Wi-Fi communication through the wireless LAN I/F 20, using a Wi-Fi Direct (WFD) wireless network (hereinafter referred to as the Wi-Fi Direct Network "WFDNW").

The control unit 30 includes a CPU 32 and a memory 34. The memory 34 is composed of a ROM, a RAM, a hard disk, and so forth. The CPU 32 executes a variety of processes (for example, a process shown in FIG. 3 as will be described later) according to program 36 stored in the memory 34.

(WFD System)

Next, the WFD system will be described. The WFD system is a wireless communication system described in the standard "Wi-Fi Peer-to-Peer (P2P) Technical Specification Version 1.1" prepared by the Wi-Fi Alliance.

In the following description, a device that supports the WFD system is referred to as the "WFD device." The foregoing WFD standard defines three states for the WFD device: a group owner state (hereinafter referred to as the "G/O state"), a client state (hereinafter referred to as the "CL state"), and a device state. The WFD device can selectively operate in one of the foregoing three states.

The WFD device that is in the G/O state (namely, the G/O device) is a device that establishes a wireless network (namely, WFDNW) in which the WFD device operates as a master station. The WFD device that is in the CL state (namely, the CL device) is a device that operates as a client station. The WFD device that is in the device state is a device that does not belong to the WFDNW (namely, the non-WFD device).

The G/O device can execute the wireless communication for target data with the CL device without relaying through other devices. The target data include information of a network layer of an OSI reference model and information that is present in layers higher than the network layer (for example, an application layer). The target data include for example print data that are images to be printed. In addition, the G/O device can forward target data for which a pair of CL devices wirelessly communicate with each other. Thus, the WFDNW allows each device to wirelessly communicate for target data without accessing through an access point (hereinafter abbreviated as an "AP") that is facilitated separately from all of the devices. In other words, the WFD system can be a wireless communication system that does not use APs.

Although the G/O device cannot wirelessly communicate for target data with a device that does not belong to the WFDNW, the G/O device can establish a wireless connection for connection data with the non-WFDNW device so as to establish the wireless connection with the non-WFDNW device. As a result, the G/O device allows the non-WFDNW device to join the WFDNW.

The connection data include information of layers lower than the network layer of the OSI reference model (for example, a physical layer, a data link layer, and so forth), in other words the connection data do not include information of the network layer. The connection data are categorized only as WFD connection data including data intrinsic to the WFD system and regular connection data that do not include the data intrinsic to the WFD system.

The regular connection data include for example a Probe Request/Response signal, an Authentication Request/Response signal, an Association Request/Response signal, a WSC Exchange signal, a 4-Way Handshake signal, and so forth. The Probe Request signal is a signal that is used to search a device that operates as a master station of the wireless network (for example, a G/O device and an AP). The Probe Response signal is a response signal of the Probe Request signal. The Authentication Request signal is a signal that identifies an authentication system. The Authentication Response signal is a response signal of the Authentication Request signal. The Association Request signal is a signal that is used to request a device to execute a connection. The Association Response signal is a response signal of the Association Request signal. The WSC Exchange signal is a signal that is used to supply a variety of information such as a password and so forth. The 4-Way Handshake signal is a signal that is used to execute authentication.

Besides the foregoing regular connection data, the WFD connection data include as the data intrinsic to the WFD system, for example, an Invitation Request/Response signal, a Provision Discovery Request/Response signal, and so forth. The Invitation Request signal is a signal that is used to cause a device to join the WFDNW. The Invitation Response signal is a response signal of the Invitation Request signal. The Provision Discovery Request signal is a signal that is used to identify a Wi-Fi Protected Setup (WPS) system (for example, a push button system, a PIN code system, and so forth). The Provision Discovery Response signal is a response signal of the Provision Discovery Request signal.

Besides the foregoing connection data, a device that has not established the wireless connection according to the WFD system can execute a wireless connection (between for example a G/O device and a non-WFDNW device and between two non-WFDNW devices) using a Service Discovery packet and its response based on the WFD system.

The Service Discovery packet and its response are signals that are not used in the regular Wi-Fi wireless communication. The Service Discovery packet and its response are signals that are used to identify what function (for example, a print function) the communication target device can execute. The Service Discovery packet and its response are data including information of layers lower than the network layer of the OSI reference model (for example, the physical layer, the data link layer, and so forth) (namely, data that do not include information of the network layer).

(Configurations of Printers 200 and 300)

The printer 300 has the same configuration as the printer 10. A print execution unit of the printer 300 can execute both the color print function and the monochrome print function. Although the printer 200 has the same configuration as the printer 10 except for the print execution unit, the print execution unit of the printer 200 cannot execute the color print function.

(Configuration of Scanner 400)

The scanner 400 is provided with a scan execution unit (not shown) instead of the print execution unit 16 of the printer 10. The scan execution unit is a scanning mechanism such as a CCD or a CIS.

(Configuration of Portable Terminal 100)

The portable terminal 100 is a portable terminal device such as a mobile phone (for example, a smart phone), a PDA, a note PC, a tablet PC, a portable music player, or a portable video player. The portable terminal 100 includes an operation unit 112, a display unit 114, a wireless LAN I/F 120, and a control unit 130. The individual units 112 to 130 are connected to a bus line (not shown).

The operation unit 112 is provided with a plurality of keys. When the user operates the operation unit 112, the user can give a variety of instructions to the portable terminal 100. The display unit 114 is a display that displays a variety of information. Like the wireless LAN I/F 20, the wireless LAN I/F 120 is an interface through which the Wi-Fi communication is made according to the Wi-Fi system.

The control unit 130 includes a CPU 132 and a memory 134. The memory 134 is composed of a ROM, a RAM, a hard disk, and so forth. The CPU 132 executes a variety of processes according to a program 136 stored in the memory 134. The program 136 includes applications that cause a device (for example, the printer 10 or the scanner 400) to execute functions (for example, a print function, a scan function, and so forth) (hereinafter these applications are referred to as the "functional applications"). The functional applications may be installed in the portable terminal 100 from a server provided by the vendor of a device or from a non-transitory computer-readable recording medium accompanied by the device.

Figure 2:
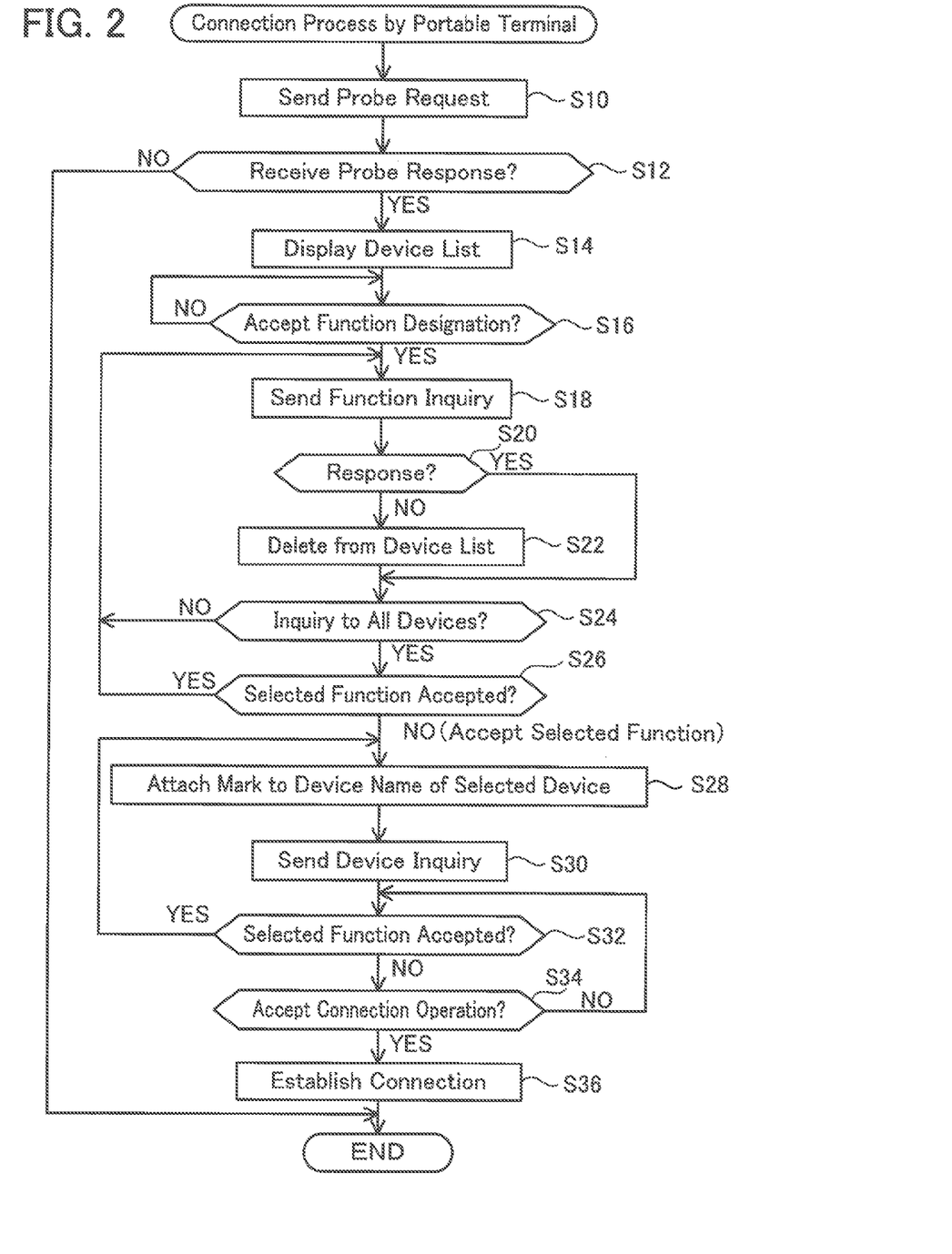
FIG. 2 shows a flow chart of a connection process of a portable terminal.

(Connection Process Executed by Portable Terminal 100; FIG. 2)

The user of the portable terminal 100 wants to cause a printer to print data stored in the portable terminal 100, by using the portable terminal 100. Alternatively, the user may want to cause the portable terminal 100 to store scanned data of a manuscript. When the portable terminal 100 has not joined the WFDNW, namely when the portable terminal 100 is in the device state, the user needs to cause the portable terminal 100 to join the same WFDNW as a device that can execute a function that the user wants (for example, the print function or the scan function) has joined. In this case, the user operates the operation unit 112 of the portable terminal 100 to start up a device application. When the device application is activated, the CPU 132 executes the connection process shown in FIG. 2.

In S10, the CPU 132 broadcasts the Probe Request Signal. In S12, the CPU 132 monitors whether or not it has received the Probe Response signal as a response to the Probe Request signal. If the CPU 132 has sent the Probe Request signal and has not received the Probe Response signal for a predetermined period of time (NO in S12), the CPU 132 completes the connection process. In contrast, if the CPU 132 has sent the Probe Request signal and has received the Probe Response signal from at least one device (namely, a G/O device and a non-WFDNW device) until the predetermined period of time has elapsed (YES in S12), the process advances to S14. The Probe Response signal includes the device name of the device. A process that the CPU 132 sends the Probe Request signal and receives the Probe Response signal to find a G/O device in the neighborhood of the printer 10 is a scan process. On the other hand, a process that the CPU 132 sends the Probe Request signal and receives the Probe Response signal to find a non-WFDNW device in the neighborhood of the printer 10 is a search process.

In S14, the CPU 132 causes the display unit 114 to display a device list that represents a list of at least one device name included in at least one received Probe Response signal. Alternatively, as a modification of this embodiment, the device list may represent SSIDs instead of device names. In S16, the CPU 132 causes the display unit 114 to display a first function designation list along with the device list. The first function designation list includes a character string that represents the print function and the scan function.

When the display unit 114 displays the first function designation list, the user performs a first function designation operation that selects a first function (for example, the print function) that the user wants to do (an operation that selects for example a character string "print function") with the operation unit 112. In S16, the CPU 132 monitors whether or not the user's first function designation operation has been accepted.

The CPU 132 periodically executes processes S10 to S14 while monitoring the function designation operation in S16. As a result, after the Probe Request signal is sent in first S10, the device list including the device name of a device, the communication state of which with the portable terminal 100 has been switched from "not available" (the power being turned off, for example) to "available" (the power being turned on, for example), can be displayed. Alternatively, after the Probe Request signal is sent in first S10, the device list that does not include the device name of a device, the communication state of which with the portable terminal 100 has been switched from "available" (the power being turned on, for example) to "not available" (the power being turned off, for example), can be displayed.

If the function designation operation has been accepted (YES in S16), in S18, the CPU 132 sends a function inquiry denoting whether or not the designated function can be executed to each of at least one device included in the device list. Specifically, the CPU 132 sends as the function inquiry a Service Discovery packet according to the WFD system. The Service Discovery packet includes function information that represents the designated function and the device name. The function information included in the Service Discovery packet is information that represents the contents of the inquiry. The device name included in the Service Discovery packet is information that represents the destination of the Service Discovery packet.

In S20, the CPU 132 monitors whether or not a response to the function inquiry has been received. If the response has been received before a predetermined period of time has elapsed (YES in S20), the process advances to S24 skipping S22. In contrast, if the response has not been received before the predetermined period of time has elapsed (NO in S20), the process advances to S22. In S22, the CPU 132 deletes the device name that represents the destination device of the function inquiry sent in S18 from the device list. Thereafter, the process advances to S24. As a result, the function list displayed on the display unit 114 includes the device name of the device from which the response to the function inquiry had been received (a device that can execute the function accepted in S16) and does to include the device name of the device from which the response to the device inquiry had not been received (a device that cannot execute the function accepted in S16). Alternatively, as a modification of this embodiment, when the CPU 132 receives the response to the function inquiry, the CPU 132 may newly generate a device list that represents a device name included in the response so as to update the device list.

In S24, the CPU 132 determines whether or not the function inquiry has been sent to all the devices having the device names included in the device list displayed in S14. If there is a device name of a device to which the CPU 132 has not sent the function inquiry (NO in S24), the process returns to S18. In contrast, if the function inquiry has been sent to all the devices (YES in S24), the process advances to S26.

In S26, the CPU 132 causes the display unit 114 to display a second function designation list besides the function list. The second function designation list depends on the function designated in S16. For example, if the print function has been designated in S16, the CPU 132 causes the display unit 114 to display the second function designation list including the color print function and the monochrome print function. In contrast, if the scan function has been designated in S16, the CPU 132 causes the display unit 114 to display the second function designation list including the color scan function and the monochrome scan function. In other words, the second function designation list is a list that designates a more detailed function than the functions designated in the first function designation list (lower level functions than the function designed in the first function designation list).

When the display unit 114 displays the second function designation list, the user can perform a second device selection operation that selects a second function (for example, the color print function) the user wants to do with the operation unit 112. In addition, the user can perform a device selection operation that selects one device name from the device list displayed on the display unit 114 with the operation unit 112. In S26, the CPU 132 monitors whether or not the user has performed the second function designation operation or the function selection operation. If the second function designation operation has been accepted (YES in S26), the process returns to S18.

In contrast, if the device selection operation has been accepted (NO in S26), the process advances to S28. In S28, the CPU 132 causes the display unit 114 to display the function list in which the device name selected in S26 in the device list is marked (for example, a black circle has been added to the character string that represents the device name).

The CPU 132 periodically executes process S18 to S24 while monitoring the function selection operation in S26. As a result, the device list that corresponds to changes of the device's communication state (namely, whether the device can communicate with the portable terminal 100) can be displayed.

Thereafter, in S30, the CPU 132 sends a device inquiry to the individual devices 10 and 200 to 400. Specifically, as the device inquiry, the CPU 132 sends the Service Discovery packet according to the WFD system. The Service Discovery packet includes a selected device name. In other words, the Service Discovery packet includes the device name included in the Probe Response signal received in S12. The device name included in the Service Discovery packet is information that represents the contents of the inquiry and also information that represents the destination of the Service Discovery packet. Alternatively, as a modification of the embodiment, the Service Discovery packet may include information that is uniquely identified corresponding to a device such as an SSID or a MAC address together with or instead of the device name. The information intrinsic to the device may be information included in the Probe Response signal received in S12 or information obtained beside the Probe Response signal.

In S10 to S30, the wireless communication is executed between the portable terminal 100 and a device through a communication layer lower than the network layer of the OSI reference model. In other words, the wireless communication is executed between the portable terminal 100 and a device by not using a communication layer equal to or higher than the network layer of the OSI reference model.

Thereafter, in S32, the CPU 132 monitors whether or not the user further has performed the device selection operation. If the device selection operation has been accepted (YES in S32), the process returns to S28. In contrast, if the device selection operation has not been accepted (NO in S32), the process advances to S34. In S34, the CPU 132 monitors whether or not the user has performed the connection operation with the operation unit 112. The connection operation includes an operation of a connection button displayed on the display unit 114 and an operation that selects a device name from the device list.

If the user's connection operation has been accepted (YES in S34), the process advances to S36. In S36, the CPU 132 establishes the connection with the device represented by the device name selected by the connection operation (e.g., the printer 10).

Specifically, the CPU 132 sends a connection request (namely, the Association Request signal) to a device having a device name selected by the connection operation (hereinafter this device is referred to as the "target device") and executes G/O negotiation with the target device. In the G/O negotiation with the target device, the CPU 132 sends information that represents its G/O priority to the target device and receives information that represents the G/O priority of the target device therefrom. The G/O priority is an index that represents the degree of the G/O state and is pre-assigned to each device.

The CPU 132 compares the G/O priority of the portable terminal 100 with that of the target device, decides the device having the higher G/O priority to be a G/O device, and decides the device having the lower G/O priority to be a CL device. Likewise, the target device decides the device having the higher G/O priority to be a G/O device and decides the device having the lower G/O priority to be a CL device based on the G/O priority of the printer 10 and the own G/O priority.

If the portable terminal 100 decides the portable terminal 100 itself to be the G/O device in the G/O negotiation, the CPU 132 sends WFD wireless setting information stored in the memory 134 to the target device. The WFD wireless setting information includes information of an authentication system, an encryption system, a password, an SSID, a basic service set identifier (BSSID), and so forth. The information of the authentication system, the encryption system, and the password included in the WFD wireless setting information is used for authentication and encryption in the WFDNW. The SSID included in the WFD wireless setting information is a network identifier that identifies the WFDNW. The BSSID included in the WFD wireless setting information is a MAC address of the G/O device. Hereinafter, the wireless setting information is referred to as the WSI (abbreviation of Wireless Setting Information).

When the CPU 132 supplies the WFDWSI to the target device, the target device requests the portable terminal 100 to authenticate the target device according to the WFDWSI (namely, the target device sends the Authentication Request signal to the portable terminal 100). If the CPU 132 has successfully authenticated the target device, a connection is established between the printer 10 and the target device. The CPU 132 registers the MAC address of the target device to a management list of the printer 10. As a result, the portable terminal 100 newly belongs to the WFDNW as the G/O device (namely, the portable terminal 100 newly establish the WFDNW) and the target device newly belongs to the WFDNW as the CL device.

In contrast, if the CPU 132 has decided the portable terminal 100 to be the CL device in the G/O negotiation, the target device prepares the WFDWSI and supplies it to the portable terminal 100. The CPU 132 obtains the WFDWSI from the target device and requests the target device to authenticate the portable terminal 100 according to the WFDWSI. If the target device has successfully authenticated the portable terminal 100, a connection is established between the portable terminal 100 and the target device. The target device registers the WFDMAC of the portable terminal 100 to the management list of the target device. As a result, the target device newly belongs to the WFDNW as the G/O device (namely, the target device newly establishes the WFDNW) and the portable terminal 100 newly belongs to the WFDNW as the CL device.

When the connection has been established between the portable terminal 100 and the target device, wireless communication is executed between them through a communication layer of the network layer or higher layer of the OSI reference model.

Figure 3:
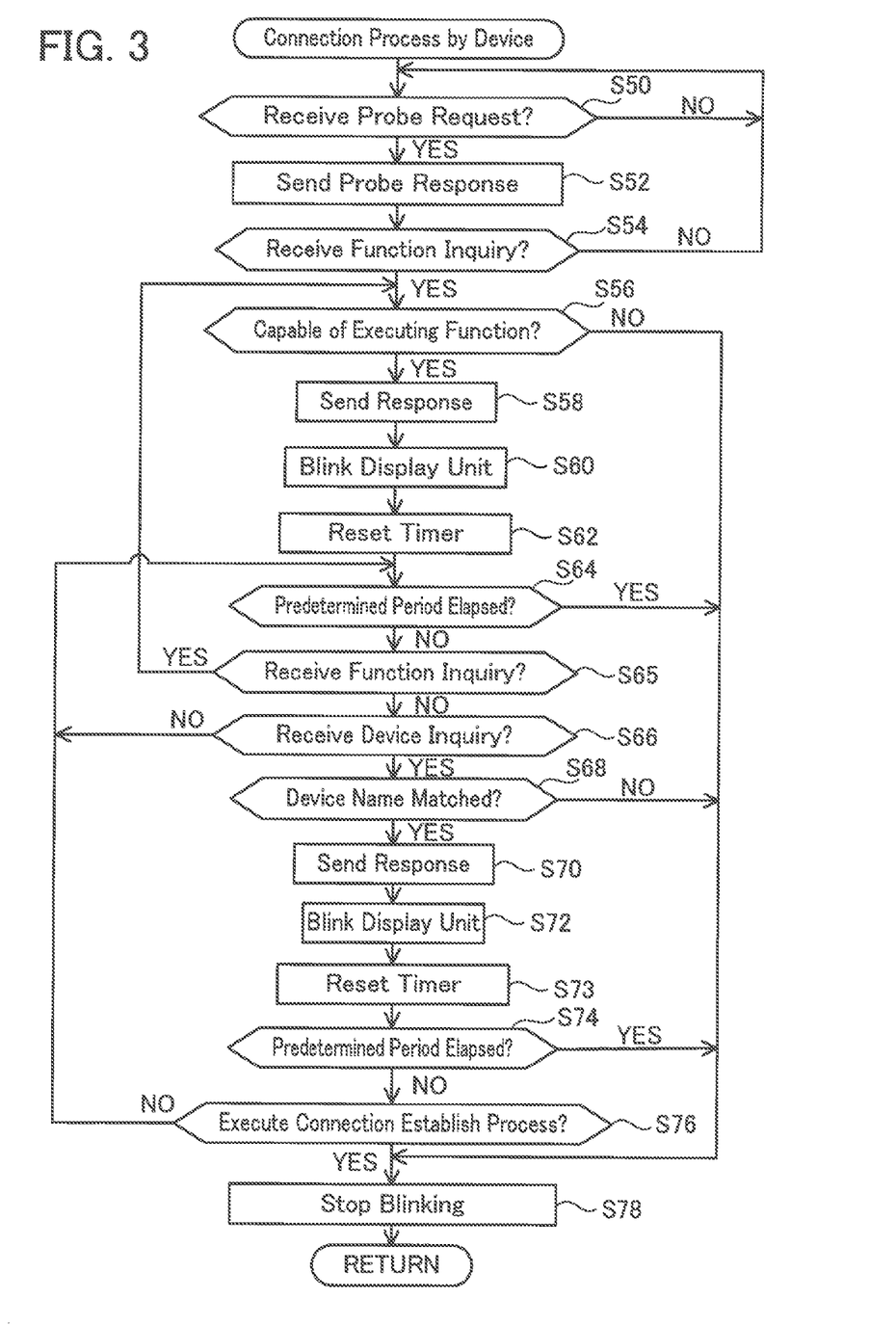
FIG. 3 shows a flow chart of a connection process of a device.

(Connection Process Executed by Device; FIG. 3)

Next, with reference to FIG. 3, processes executed by the printers 10, 200, and 300 and the scanner 400 will be described. In the following, the process executed by the CPU 32 of the printer 10 will be described. The CPUs of the printers 200 and 300 and the scanner 400 execute the same process as the CPU 32 of the printer 10 executes.

When the power of the printer 10 is switched from the OFF state to the ON state, the CPU 32 executes the process shown in FIG. 3. In S50, the CPU 32 monitors whether or not the Probe Request signal has been received. If the Probe Request signal has been received (YES in S50), the process advances to S52. In S52, the CPU 32 sends the Probe Response signal to the sender of the Probe Request signal (e.g., the portable terminal 100). The Probe Response signal includes the device name of the printer 10.

Thereafter, in S54, the CPU 32 monitors whether or not a function inquiry has been received from the sender of the Probe Request signal (e.g., the portable terminal 100). If the function inquiry has not been received (NO in S54), the process returns to S50. In contrast, if the function inquiry has been received until a predetermined period of time has elapsed after the Probe Request signal has been sent (YES in S54), the process advances to S56. In S56, the CPU 32 determines whether or not to a function (for example, the print function) represented by the function information included in the function inquiry can be executed.

If the CPU 32 determines that the printer 10 cannot execute the function represented by the function information (NO in S56), the process advances to S78. In contrast, if the CPU 32 determines that the printer 10 can execute the function represented by the function information (YES in S56), the process advances to S58. In S58, the CPU 32 sends a response that denotes that the printer 10 can execute the function represented by the function information to the sender of the function inquiry.

In S60, the CPU 32 causes the display unit 14 to blink. If the display unit 14 is already blinking, the CPU 32 does not cause the display unit 14 to stop blinking, but keeps the display unit 14 blinking. In S62, the CPU 32 resets a timer count of the control unit 30 and starts counting the timer. In S64, the CPU 32 determines whether or not a predetermined period of time has elapsed after receiving the function inquiry in S54 or S65 that will be described later. The predetermined period of time in S64 is longer than an interval for which the sender of the function inquiry (e.g., the portable terminal 100) repeatedly sends the function inquiry (namely, the Service Discovery signal). Specifically, in S64, if the count of the timer that was reset in S62 is "0," the CPU 32 determines that the predetermined period of time has elapsed (YES in S64). If the count of the timer is greater than "0," the CPU 32 determines that the predetermined period of time has not elapsed (NO in S64). If the determined result in S64 is YES, the process advances to S78. If the determined result in S64 is NO, the process advances to S65.

In S65, the CPU 32 determines whether or not the function inquiry has been received. If the function inquiry has been received (YES in S65), the process returns to S56. If the function inquiry has not been received (NO in S65), the process advances to S66. In S66, the CPU 32 determines whether or not a device inquiry has been received from the sender of the function inquiry (for example, the portable terminal 100). If the device inquiry has not been received (NO in S66), the process returns to S64. If the device inquiry has been received (YES in S66), the process advances to S68. In S68, the CPU 32 determines whether or not the device name included in the device inquiry matches the device name of the printer 10. If the device name included in the device inquiry does not match the device name of the printer 10 (NO in S68), the process advances to S78.

In contrast, if the device name included in the device inquiry matches the device name of the printer 10 (YES in S68), the process advances to S70. In S70, the CPU 32 sends a response to the device inquiry, the response representing matching of these device names to the sender of the device inquiry. Thereafter, in S72, the CPU 32 causes the display unit 14 to blink. If the display unit 14 is already blinking, the CPU 32 does not cause the display unit 14 to stop blinking, but keeps the display unit 14 blinking.

In S73, the CPU 32 resets the timer of the control unit 30 and starts counting the timer. Thereafter, in S74, the CPU 32 determines whether or not the predetermined period of time has elapsed after the device inquiry has been received in S66 in the same manner as the CPU 32 had done in S64. If the predetermined period of time has elapsed (YES in S74), the process advances to S78. The predetermined period of time in S74 is the same as that in S64 and is greater than the interval for which the sender of the device inquiry (for example, the portable terminal 100) repeatedly sends the device inquiry (namely, Service Discovery). Alternatively, as a modification of the embodiment, the predetermined period of time in S74 may be different from the predetermined period of time in S64.

In contrast, if the predetermined period of time has not elapsed (NO in S74), the process advances to S76. In S76, the CPU 32 determines whether or not the connection establishment process has to be executed. Specifically, if the information that represents the G/O priority sent from the sender of the device inquiry (for example, the portable terminal 100) (for example, in S40 shown in FIG. 2) has been received, the CPU 32 determines that the connection establishment process has to be executed. In contrast, if the information that represents the G/O priority has not been received, the CPU 32 determines that the connection establishment process does not have to be executed (NO in S76). If the determined result in S76 is NO, the process returns to S65. In contrast, if the determined result denotes that the connection establishment process has to be executed, the CPU 32 establishes a connection with the sender of the information that represents the G/O priority and establishes the WFDNW. Thereafter, the process advances to S78.

In S78, the CPU 32 causes the display unit 14 to stop blinking. Thereafter, the process returns to S50. If the display unit 14 is not blinking, the process returns to S50, skipping S78. As described in the connection process of the portable terminal 100 shown in FIG. 2, the sender of the function inquiry periodically sends the function inquiry (namely, the Service Discovery signal). In addition, the sender of the device inquiry periodically sends the device inquiry (namely, the Service Discovery). Thus, while the printer 10 can communicate with each of senders of these inquiries, the CPU 32 keeps the display unit 14 blinking until the determined result in S56 or S68 becomes NO or the connection is established.

In S50 to S76, wireless communication between the printer 10 and the sender of each signal is executed on a communication layer lower than the network layer of the OSI reference model, i.e., not using a communication layer equal to or higher than the network layer of the OSI reference model. When the connection is established in the process in S76, wireless communication is executed between the printer 10 and the device through a communication layer that is equal to or higher than the network layer of the OSI reference model.

Effect of Embodiment

Next, with reference to FIG. 4 to FIG. 7, a specific example accomplished by the printers 10, 200, and 300, the scanner 400 (hereinafter they are collectively referred to as the devices 10 and 200 to 400) and the portable terminal 100 will be described. The example shown in FIG. 4 to FIG. 7 is accomplished by the portable terminal 100 that executes the process shown in FIG. 2 and the devices 10 and 200 to 400 that execute the process shown in FIG. 3.

Figure 4:
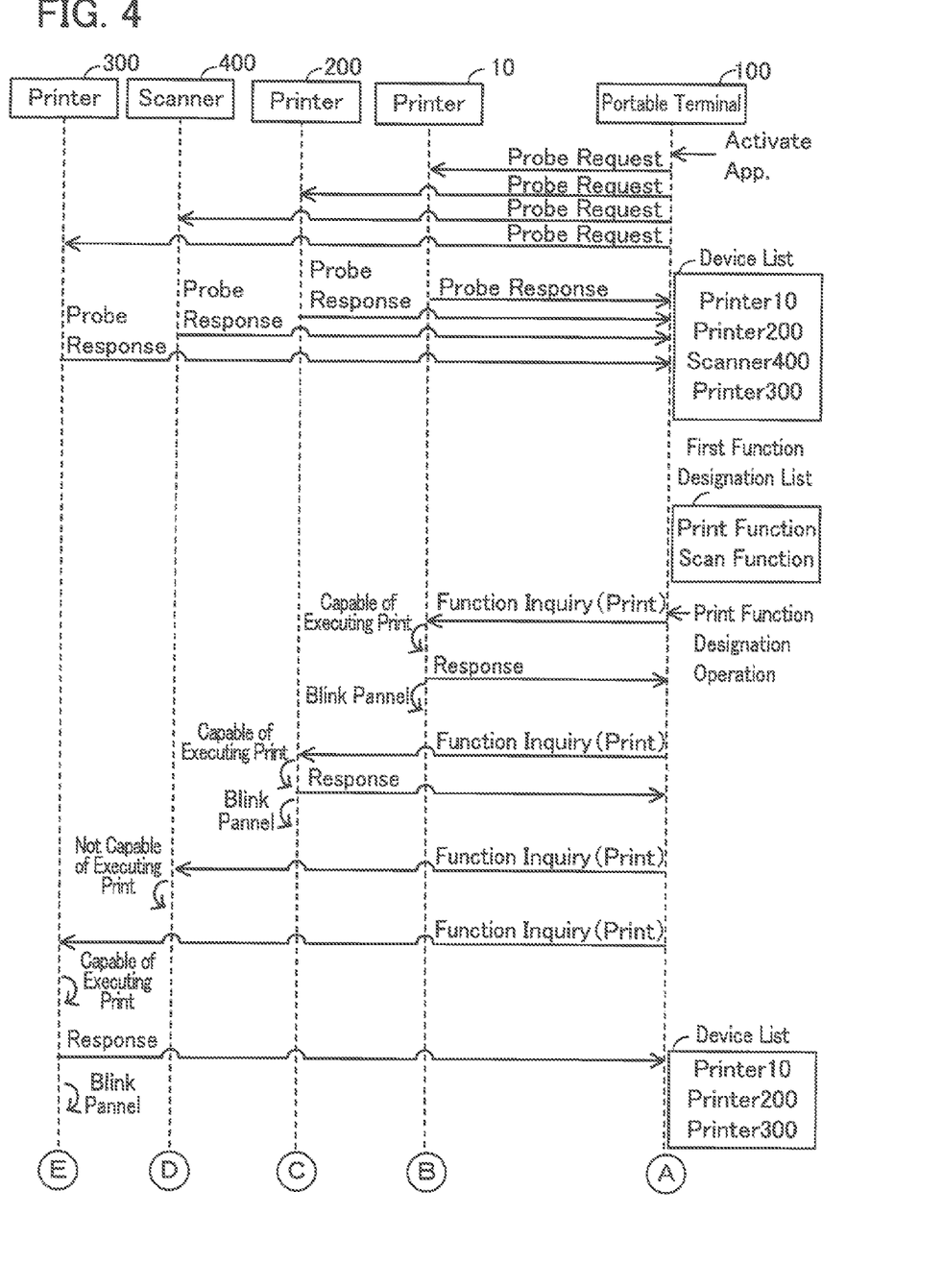
FIG. 4 shows a sequence chart of each process executed by the portable terminal and the device.

(Search Process for Device; FIG. 4)

In the initial state shown in FIG. 4, the devices 10 and 200 to 400 are in the device state. When the user of the portable terminal 100 operates the operation unit 112, a device application is activated. When the device application is activated, the portable terminal 100 broadcasts the Probe Request signal (in S10 shown in FIG. 2).

When each of the devices 10 and 200 to 400 receives the Probe Request signal (YES in S50 shown in FIG. 3), each of the devices 10 and 200 to 400 sends the Probe Response signal to the portable terminal 100 (in S52).

When the portable terminal 100 receives the Probe Response signals from the devices 10 and 200 to 400 (YES in S12 shown in FIG. 2), the portable terminal 100 causes the display unit 114 to display a device list of device names included in the Probe Response signals (for example, "printer 10," "printer 200") (in S14). In addition, the portable terminal 100 causes the display unit 114 to display a first function designation list that includes "print function" and "scan function." When the user selects the "print function," the user performs a first function designation operation with the operation unit 112 (YES in S16). When the portable terminal 100 accepts the selection of the "print function," the portable terminal 100 sends a function inquiry that includes function information that represents the print function and each of the device names to the devices 10 and 200 to 400 having their device names included in the device list (in S18).

When the printer 10 receives the function inquiry (YES in S54 shown in FIG. 3), the printer 10 determines that the printer 10 can execute the print function (YES in S56) and sends a response that denotes that the printer 10 can execute the print function to the portable terminal 100 (in S58). Thereafter, the printer 10 causes the display unit 14 to start blinking (in S60), resets the timer, and starts counting (in S62). Like the printer 10, the printers 200 and 300 determine that they can execute the print function (YES in S56) and execute the process from S58 to S62 shown in FIG. 3.

In contrast, since the scanner 400 does not have the print execution unit, the scanner 400 cannot execute the print function. When the scanner 400 receives the function inquiry (YES in S54 shown in FIG. 3), the scanner 400 determines that the scanner 400 cannot execute the print function (NO in S56). In this case, the scanner 400 does not send a response of the function inquiry to the portable terminal 100. Nor does the scanner 400 cause the display unit of the scanner 400 to blink (the scanner 400 does not execute the process from S58 to S62). Thereafter, the scanner 400 completes the process.

If the portable terminal 100 has sent the function inquiry to the scanner 400 and has not received the response of the function inquiry from the scanner 400 within the predetermined period of time, the portable terminal 100 deletes the device name of the scanner 400 from the device list (in S22 shown in FIG. 2). As a result, the device list represents only the device names of the printers 10, 200, and 300 that can execute the print function. Thus, the user can identify the device names of the printers 10, 200, and 300 that can execute the print function from among the devices 10 and 200 to 400, by using the device list. In addition, since the display units of the printers 10, 200, and 300 are blinking, the user can easily identify the printers 10, 200, and 300 that can execute the print function (namely, their locations).

Figure 5:
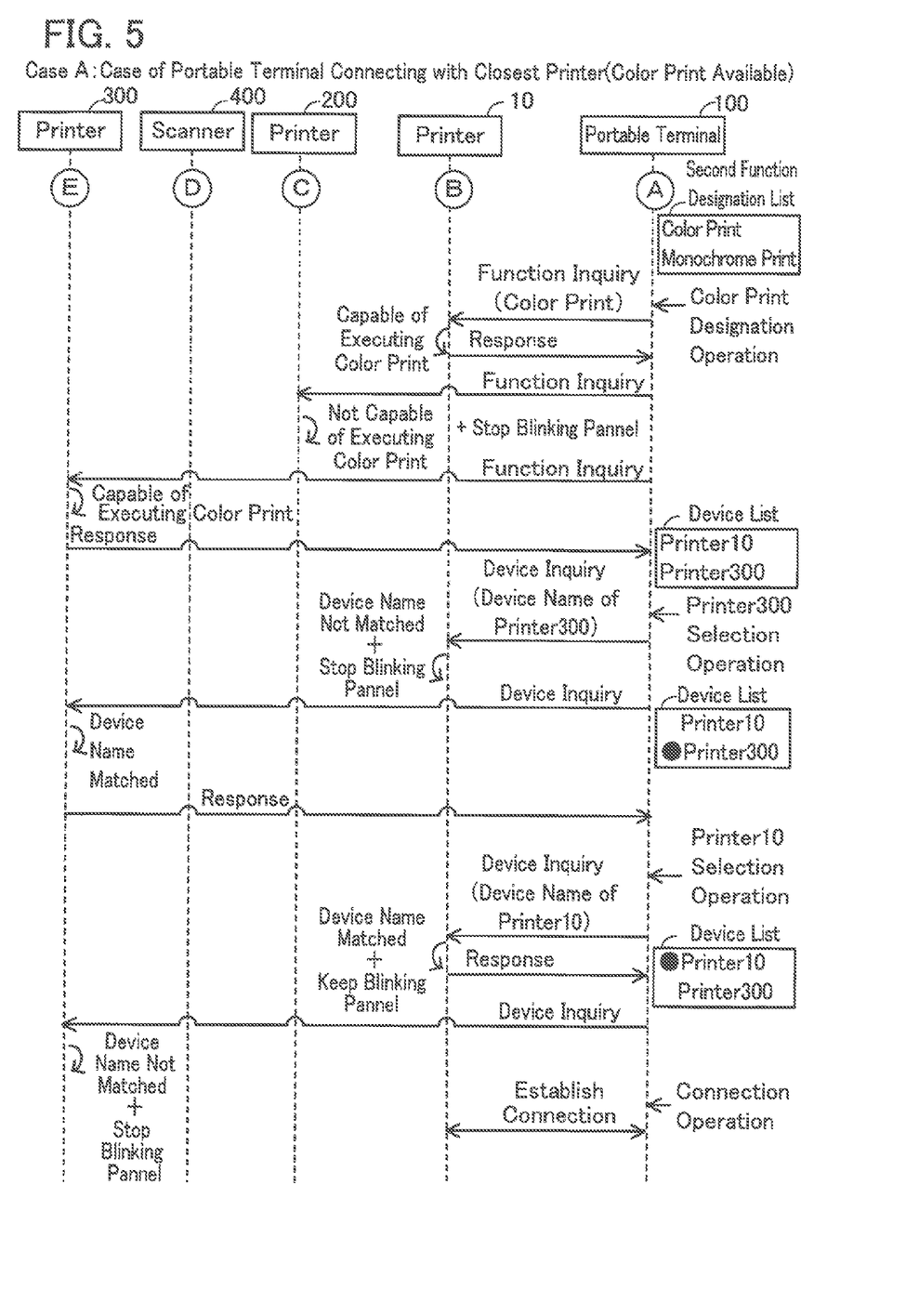
FIG. 5 shows a sequence chart of case A continued from FIG. 4.

(Case A: The Portable Terminal 100 is Connected to the Printer 10 that is the Closest to the Portable Terminal 100; FIG. 5)

When the process shown in FIG. 4 is complete, the portable terminal 100 causes the display unit 114 to display the second function designation list along with the device list. The second function designation list includes "color print" and "monochrome print" that are detailed functions of the print function. Alternatively as a modification of the embodiment the second function designation list may include "duplex print" and "1-in-2 print" as well as, or instead of "color print" and "monochrome print."

The user performs the second function designation operation with the operation unit 112 to select "color print" (YES in S26). When the portable terminal 100 accepts the selection of the "color print," the portable terminal 100 sends a function inquiry including function information that represents the color print function and the device name of each of the printers 10, 200, and 300 to the printers 10, 200, and 300 having the device names included in the device list (in S18).

When the printer 10 receives the function inquiry (YES in S65 shown in FIG. 3), the printer 10 determines that it can execute the color print function (YES in S56) and sends a response that denotes that the printer 10 can execute the color print function to the portable terminal 100 (in S58). The printer 10 keeps the display unit 14 blinking (in S60), resets the timer, and restarts counting (in S62). Like the printer 10, the printer 300 determines that it can execute the color print function (YES in S65) and executes the process from S58 to S62 shown in FIG. 3.

In contrast, since the printer 200 does not have the print execution unit that executes the color print function, the printer 200 cannot execute the color print function. When the printer 200 receives the function inquiry (YES in S54 shown in FIG. 3), the printer 200 determines that the printer 200 cannot execute the color print function (NO in S56). In this case, the printer 200 does not send a response of the function inquiry to the portable terminal 100, causes the display unit to stop blinking (in S78), and completes the connection process. As a result, the printer 200 can cause the display unit to adequately stop blinking.

If the portable terminal 100 has sent the function inquiry to the printer 200 and has not received the response of the function inquiry from the printer 200 within the predetermined period of time, the portable terminal 100 deletes the device name of the printer 200 from the device list (in S22 shown in FIG. 2). As a result, the device list represents only the device names of the printers 10 and 300 that can execute the color print function. Thus, the user can identify the device names of the printers 10 and 300 that can execute the color print function from among the devices 10 and 200 to 400, by using the device list. In addition, since the display units of the printers 10 and 300 are blinking, the user can easily identify the printers 10 and 300 that can execute the color print function (namely, their locations).

The user can cause any of the printers 10 and 300 to execute the color print function. In this situation, the user wants to use a printer closer to the portable terminal 100. However, even if the user checks the device list and the display units of the printers 10 and 300, it is difficult to determine which of the printers 10 and 300 is closer to the portable terminal 100.

Thus, the user executes a device selection operation that selects the "printer 300" from the device names included in the device list. The portable terminal 100 marks the selected "printer 300" in the device list with a black symbol (in S28). When the portable terminal 100 accepts the device selection operation (NO in S26 shown in FIG. 2), the portable terminal 100 sends a device inquiry including the device information that represents the selected "printer 300" (in S30).

When the printer 10 receives the device inquiry including the device information that represents the "printer 300" (YES in S66 shown in FIG. 3), the printer 10 determines that the device name included in the device inquiry does not match the device name "printer 10" of the printer 10 (NO in S68) and causes the display unit 14 to stop blinking (in S78). As a result, the printer 10 can cause the display unit 14 to adequately stop blinking.

On the other hand, when the printer 300 receives the device inquiry (YES in S66 shown in FIG. 3), the printer 300 determines that the device name included in the device inquiry matches the device name "printer 300" of the printer 300 (YES in S68) and sends a response to the device inquiry (in S70). In addition, the printer 300 resets the timer. As a result, the display unit of the printer 300 remains blinking. As a result, the display unit of the printer 300 is blinking, whereas the display unit 14 of the printer 10 is not blinking. Thus, the user can identify the printer 300 corresponding to the "printer 300" of the device list.

Thereafter, the user executes a device selection operation that selects the "printer 10" from the device names included in the device list. The portable terminal 100 marks the selected "printer 10" in the device list with a black symbol (in S28 shown in FIG. 2). When the portable terminal 100 accepts the device selection operation (YES in S32), the portable terminal 100 sends a device inquiry including the device information that represents the selected "printer 10" (in S30).

When the printer 10 receives the device inquiry (YES in S66 shown in FIG. 3), the printer 10 determines that the device name included in the device inquiry matches the device name "printer 10" of the printer 10 (YES in S68) and sends a response to the device inquiry (in S70). Since the display unit of the printer 10 is not blinking (YES in S71), the printer 10 causes the display unit 14 to start blinking (in S72). In addition, the printer 10 resets the timer (in S73).

When the printer 300 receives the device inquiry (YES in S66 shown in FIG. 3), the printer 300 determines that the device name included in the device inquiry does not match the device name "printer 300" of the printer 300 (NO in S68) and causes the display unit 14 to stop blinking (in S78). As a result, the display unit 14 of the printer 10 is blinking, whereas the display unit of the printer 300 is not blinking. Consequently, the user can identify the printer 10 corresponding to the "printer 10" of the device list. Thus, the user can identify the printer 10 closer to the portable terminal 100.

The user performs a connection operation that includes an operation that selects the character string "printer 10" that represents the identified printer 10 from the device list with the operation unit 12. When the portable terminal 100 accepts the connection operation (YES in S34 shown in FIG. 2), the portable terminal 100 establishes a connection with the printer 10 (YES in S36 shown in FIG. 2, YES in S76 shown in FIG. 3).

When the connection of the portable terminal 100 to the portable terminal 100 is established, the printer 10 causes the display unit 14 to stop blinking (in S78 shown in FIG. 3).

Thus, when the user operates the operation unit 112 of the portable terminal 100, the user can cause the printer 10 connected to the portable terminal 100 to execute the color print function.

Figure 6:
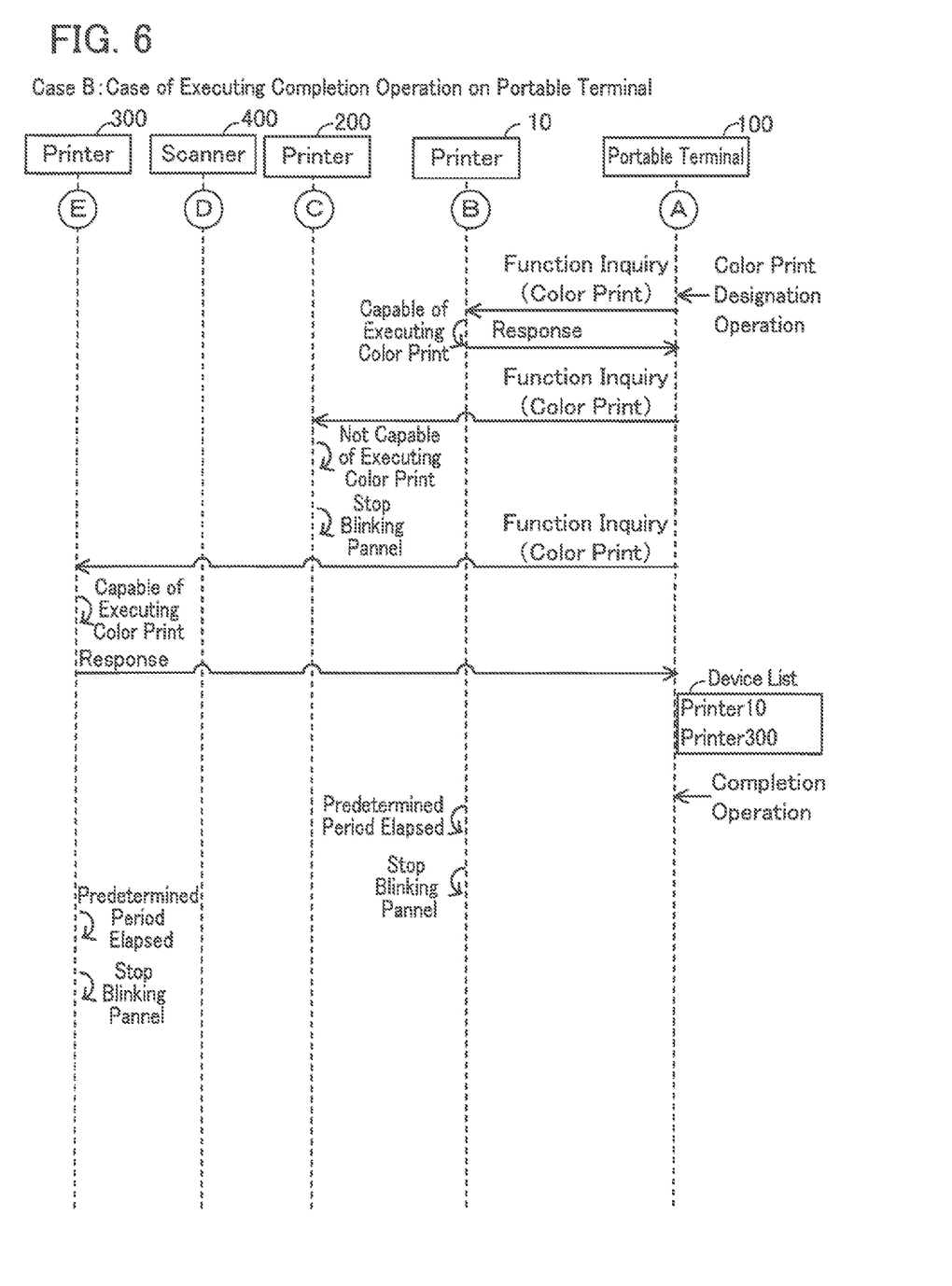
FIG. 6 shows a sequence chart of case B continued from FIG. 4.

(Case B: The Completion Operation is Performed on the Portable Terminal 100; FIG. 6)

In case B shown in FIG. 6, the process in which the portable terminal 100 sends a function inquiry including function information that represents the color print function to the printers 10, 200, and 300 (in S18 shown in FIG. 2) and the portable terminal 100 receives replies from the printers 10 and 300 (YES in S20) and deletes the device name "printer 200" from the device list (in S22 shown in FIG. 2) is the same as the process shown in FIG. 5.

In this situation, the display units of the printers 10 and 300 are blinking. If both the printers 10 and 300 are not present in the neighborhood of the portable terminal 100 or the user wants to execute another function (for example, the scan function), the user may want to complete the process. In this case, the user turns off the power of the portable terminal 100 or operates for example a completion key on the display unit 114 to perform the completion operation. When the user performs the completion operation, the portable terminal 100 causes the display unit 114 not to display the device list and completes the functional application. As a result, the portable terminal 100 stops executing the process that repeatedly sends the function inquiry.

If the printers 10 and 300 have received the function inquiry including function information that represents the color print function from the portable terminal 100 and has not received the function inquiry and the device inquiry for a predetermined period of time (YES in S64 shown in FIG. 3), the printers 10 and 300 cause the display units to stop blinking (in S78). As a result, even if the printers 10 and 300 do not receive a signal that completes the process from the portable terminal 100 after the completion operation has been performed on the portable terminal 100, the printers 10 and 300 can cause the display units to stop blinking.

Figure 7:
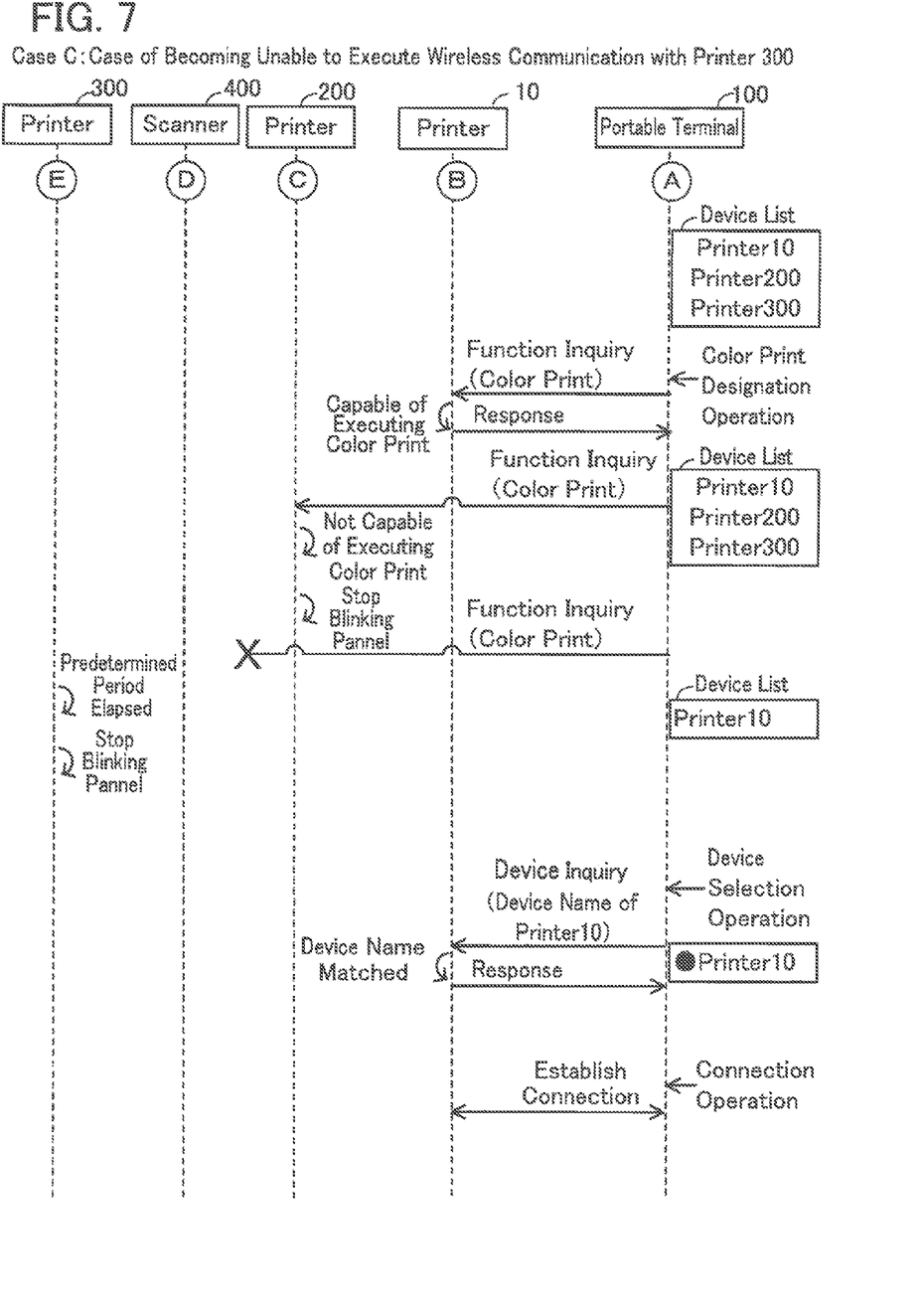
FIG. 7 shows a sequence chart of case C continued from FIG. 4.

(Case C: The Portable Terminal 100 Becomes Unable to Communicate with the Printer 300; FIG. 7)

In case C shown in FIG. 7, the process in which the portable terminal 100 sends a function inquiry including function information that represents the color print function to the printers 10 and 200, receives a response from the printer 10 (YES in S20), and deletes the device name "printer 200" from the device list (in S22 shown in FIG. 2) is the same as the process shown in FIG. 5.

In this case, the portable terminal 100 may become unable to wirelessly communicate with the printer 300 at an occasion after the portable terminal 100 received the response to the function inquiry including the function information that represents the color function from the printer 300, and before the portable terminal 100 sends the function inquiry including function information that represents the color print function to the printer 300. For example, if a door located between the portable terminal 100 and the printer 300 is closed, the portable terminal 100 may become incapable of wirelessly communicating with the printer 300. In this case, the portable terminal 100 cannot receive the response to the function inquiry from the printer 300 (NO in S20 shown in FIG. 2). In this case, the portable terminal 100 deletes the device name "printer 300" of the printer 300 from the device list (in S22 shown in FIG. 2). As a result, the user knows that the portable terminal 100 cannot cause the printer 300 to execute the color print function.

On the other hand, if the printer 300 has received the function inquiry including function information that represents the color print function from the portable terminal 100 and has not received the function inquiry and the device inquiry from the portable terminal 100 for a predetermined period of time (YES in S64 shown in FIG. 3), the printer 300 causes the display unit to stop blinking (in S78). As a result, even if the printer 300 does not receive a signal that completes the process from the portable terminal 100 after the user has performed the completion operation, the printer 300 can cause the display unit to stop blinking.

(Relationship of Specification and Claims)

The printers 10, 200, and 300 and the scanner 400 are examples of a "function execution device" and the portable terminal 100 is an example of a "terminal device." The Probe Request signal and the Probe Response signal are examples of a "probe signal" and a "response signal" respectively. The function inquiry is an example of a "first signal" and the device inquiry is an example of a "second signal" and a "third signal." The blinking of the display unit 14 is examples of a "first notice" and a "second notice." The display unit 14 is an example of an "output unit."

Modification 1

The devices 10 and 200 to 400 may be provided with a speaker. The CPU 32 may output a sound (e.g., a sound that denotes that the print function can be executed or a sound that denotes that the device name of the target device matches that of the device inquiry) along with or instead of blinking of the display unit in S60 and S72 shown in FIG. 3.

In S60 and S72 shown in FIG. 3, the CPU 32 may output a sound to the speaker for a predetermined period of time and stop outputting the sound. Alternatively, in S60 and S72 shown in FIG. 3, the devices 10 and 200 to 400 may repeatedly execute the process that outputs the sound to the speaker for the predetermined period of time. Alternatively, in S60 and S72 shown in FIG. 3, the devices 10 and 200 to 400 may start outputting the sound to the speaker. Until the devices 10 and 200 to 400 stop outputting the sound in S78, they may continuously output it. In this modification, the speaker is a part of the "output unit," whereas the sound is an example of the "first notice" and the "second notice."

Modification 2

In S60 and S72 shown in FIG. 3, the devices 10 and 200 to 400 may cause the display unit to display a character string, graphics, or the like that denotes that the function can be executed along with or instead of blinking. In this case, if the devices 10 and 200 to 400 determine that the function cannot be executed (NO in S56), they may cause the display unit to display a character string, graphics, or the like that denotes that the function cannot be executed. In this modification, the foregoing character string, graphics, or the like is an example of the "first notice" and "second notice."

Modification 3

In the foregoing embodiment, if the devices 10 and 200 to 400 determine that the function can be executed (YES in S56 shown in FIG. 3) or that the device names match with each other (YES in S68), the devices 10 and 200 to 400 cause the display unit to blink. Alternatively, depending on whether the devices 10 and 200 to 400 determine that the function can be executed (YES in S56) or they determine that the device names match with each other, the devices 10 and 200 to 400 may execute different processes. For example, if the devices 10 and 200 to 400 determine that the function can be executed (YES in S56), they may cause the speaker to output a sound. In contrast, if the devices 10 and 200 to 400 determine that the device names match with each other (YES in S68), they may cause the display unit to blink. In this modification, the foregoing sound that is output is an example of the "first notice," whereas the blinking of the display unit is an example of the "second notice." Alternatively, if the devices 10 and 200 to 400 determine that the function can be executed (YES in S56), they may cause the display unit to blink at intervals of a first period of time (or a first color (for example, green)). In contrast, if the devices 10 and 200 to 400 determine that the device names match with each other (YES in S68), they may cause the display unit to blink at intervals of a second period of time that is different from the first period of time (or a second color (for example, red)). In this modification, the blinking at the intervals of first period of time (or green) is an example of the "first notice," whereas the blinking at the intervals of second period of time (or red) is an example of the "second notice." Generally speaking, the "first notice" may differ from the "second notice."

Modification 4

According to the foregoing embodiment, if the devices 10 and 200 to 400 determine that the function cannot be executed (NO in S56), they do not cause the display unit to blink. Alternatively, if the devices 10 and 200 to 400 determine that the function cannot be executed, they may cause the display unit to blink. In this case, the devices 10 and 200 to 400 may cause the display unit to blink in a different manner (for example, different color or blinking intervals of a different period of time) from that when they determine that the function can be executed.

Modification 5

According to the foregoing embodiment, if the devices 10 and 200 to 400 determines that the function cannot be executed (NO in S56), they do not send the response of the function inquiry to the portable terminal 100. Alternatively, if the devices 10 and 200 to 400 determine that the function cannot be executed (NO in S56), they may send a response that denotes that the function cannot be executed as the response of the device inquiry to the portable terminal 100. In this case, if the portable terminal 100 analyzes the received response and sends a response that denotes that the function cannot be executed, they may delete the device name of the sender from the device list. In contrast, if the devices 10 and 200 to 400 analyze the received response and send a response that denotes that the function can be executed, they may not delete the device name of the sender from the device list.

Modification 6

In response to the Probe Request signal, the devices 10 and 200 to 400 may send a Probe Response signal including identification information intrinsic to them such as a MAC address along with or instead of their device names. The portable terminal 100 may cause the display unit 114 to display a device list including any piece of information such as the MAC address or the like included in the received Probe Response. Generally, the portable terminal 100 may cause the display unit 114 to display a device list including identification information that identifies the devices 10 and 200 to 400. In this modification, the MAC address and identification information are examples of "related information."

Modification 7

The "function execution device" is not limited to the printer 10 and the scanner 400. Alternatively, the "function execution device" may be another communication device (for example, a multi-function device (provided with a print execution unit and a scan execution unit), a FAX device, a copy device, a telephone set, a desk-top PC, a note PC, a tablet PC, a server, a mobile phone, a PDA terminal, or the like). The "terminal device" is not limited to the portable terminal 100. Alternatively, the "terminal device" may be another communication device (for example, a multifunctional device, a Modification 8

According to the foregoing embodiment, the CPU 32 of the printer 10 executes a program (namely, software) stored in the memory 34 so as to accomplish the individual processes shown in FIG. 3 to FIG. 7. Alternatively, at least one of the processes shown in FIG. 3 to FIG. 7 may be accomplished by hardware such as a logic circuit. In addition, the CPU 132 of the portable terminal 100 executes a program (namely, software) stored in the memory 134 so as to accomplish the individual processes shown in FIG. 2 and FIG. 4 to FIG. 7. Alternatively, at least one of the processes shown in FIG. 2 to FIG. 4 to FIG. 7 may be accomplished by hardware such as a logic circuit.

The invention claimed is:

1. A function execution device comprising:
an output unit;
a processor; and
a non-transitory memory storing computer-readable instructions therein, the computer-readable instructions, when executed by the processor, causing the function execution device to execute:
receiving a Probe Request signal from a terminal device by wireless communication using a layer lower than a network layer;
sending a Probe Response signal in response to the Probe Request signal to the terminal device by wireless communication using the layer lower than the network layer;
receiving a Service Discovery signal from the terminal device by wireless communication using the layer lower than the network layer after receiving the Probe Request, the Service Discovery signal including function information indicating a first specific function;
determining whether the function execution device has the first specific function indicated by the function information included in the received Service Discovery signal;
causing the output unit to output a first notice indicating that the function execution device is capable of executing the first specific function in a case where it is determined that the function execution device has the specific function, and not to output the first notice in a case where it is determined that the function execution device does not have the first specific function;
establishing a wireless connection with the terminal device; and
communicating with the terminal device by wireless communication using the network layer after establishing the wireless connection.

2. The function execution device as in claim 1, wherein the computer-readable instructions, when executed by the processor, cause the function execution device to further execute:
receiving a second signal after having received the Service Discovery signal, the second signal including first identification information set to equipment for uniquely identifying the equipment; and
causing the output unit to output a second notice indicating that the first identification information included in the received second signal is information for identifying the function execution device in a case where the first identification information included in the received second signal is the information for identifying the function execution device, and not to output the second notice in a case where the first identification information is not the information for identifying the function execution device.

3. The function execution device as in claim 2, wherein the second notice is identical to the first notice, and
in a case where the second signal is received while the first notice is being output by the output unit, the computer-readable instructions, when executed by the processor, cause the function execution device to execute causing the output unit to keep outputting the first notice in the case where the first identification information is the information for identifying the function execution device, and to cancel the output of the first notice in the case where the first identification information is not the information for identifying the function execution device.

4. The function execution device as in claim 2, wherein the computer-readable instructions, when executed by the processor, cause the function execution device to further execute:
receiving a third signal after having received the second signal, the third signal including second identification information for identifying equipment; and
cancelling the output of the second notice when the second notice is being output by the output unit in a case where the second identification information included in the received third signal is not information for identifying the function execution device.

5. The function execution device as in claim 2, wherein the computer-readable instructions, when executed by the processor, cause the function execution device to further execute:
measuring a period of time from when the Service Discovery signal was received; and
causing the output unit to cancel the output of the first notice in a case where the second signal is not received before a predetermined period of time has passed from when the Service Discovery signal was received.

6. The function execution device as in claim 1, wherein the computer-readable instructions, when executed by the processor, cause the function execution device to further execute:
receiving, in a case where the first notice is being output by the output unit after the Service Discovery signal is received, a fourth signal including function information indicating a second specific function, the second specific function being a function that only some of the function execution devices which are capable of executing the first specific function are capable of executing; and
causing the output unit to keep outputting the first notice in a case where it is determined that the function execution device is capable of executing the second specific function, and to cancel the output of the first notice in the case where it is determined that the function execution device is not capable of executing the second specific function.

7. A communication system including a terminal device and a plurality of function execution devices, wherein
the terminal device comprises:
a first processor; and
a first memory storing first computer-readable instructions therein, the first computer-readable instructions, when executed by the first processor, causing the terminal device to execute:
sending a Probe Request signal by wireless communication using a layer lower than a network layer;
receiving a Probe Request response signal from each of the plurality of function execution devices by wireless communication using the layer lower than the network layer;

sending a Service Discovery signal including function information indicating a first specific function to each of the plurality of function execution devices by wireless communication using the layer lower than the network layer;

receiving executability information as a response signal for the Service Discovery signal from one or more specific function execution devices among the plurality of function execution devices by wireless communication using the layer lower than the network layer, the executability information indicating that the first specific function is capable of being executed; and causing a display unit to display one or more related information related to the one or more specific function execution devices;

each of the plurality of function execution devices comprises:

an output unit;

a second processor; and a second memory storing second computer-readable instructions therein, the second computer-readable instructions, when executed by the second processor, causing the function execution device to execute:

receiving the Probe Request signal from the terminal device by wireless communication using the layer lower than the network layer;

sending the Probe Response signal in response to the request signal to the terminal device by wireless communication using the layer lower than the network layer;

receiving the Service Discovery signal from the terminal device after having sent the response signal by wireless communication using the layer lower than the network layer;

determining whether the function execution device has the first specific function indicated by the function information included in the received Service Discovery signal;

sending the executable information as a response signal for the Service Discovery signal to the terminal device to in a case where it is determined that the function execution device is capable of executing the first specific function, causing the output unit to output a first notice indicating that the function execution device is capable of executing the first specific function in a case where it is determined that the function execution device has the first specific function, and not to output the first notice in a case where it is determined that the function execution device does not have the first specific function;

establishing a wireless connection with the terminal device; and communicating with the terminal device by wireless communication using the network layer after establishing the wireless connection.

8. The communication system as in claim 7, wherein
the first computer-readable instructions, when executed by the processor, cause the terminal device to further execute accepting the first specific function designated by a user, and
the Service Discovery signal sent from the terminal device includes the function information indicating the first specific function designated by the user.

9. The communication system as in claim 7, wherein
the first computer-readable instructions, when executed by the processor, cause the terminal device to further execute:
accepting one specific related information selected by a user from the one or more related information displayed on the display unit; and
establishing a connection with the function execution device related to the specific related information using a wireless communication setting, and
the second computer-readable instructions, when executed by the processor, cause the function execution device to further execute establishing the connection with the terminal device using the wireless communication setting.

10. A non-transitory computer-readable storage medium storing a computer program for a function execution device including an output unit, wherein the computer program, when executed by one or more processors of the function execution device, causes the function execution device to:
receive a Probe Request signal from a terminal device by wireless communication using a layer lower than a network layer;
send a Probe Response signal in response to the Probe Request signal to the terminal device using a layer lower than a network layer;
receive a Service Discovery signal from the terminal device by wireless communication using the layer lower than the network layer, the Service Discovery signal including function information indicating a first specific function;
determine whether the function execution device has the first specific function indicated by the function information included in the received Service Discovery signal; and
cause the output unit to output a first notice indicating that the function execution device is capable of executing the first specific function in a case where it is determined that the function execution device has the specific function, and not to output the first notice in a case where it is determined that the function execution device does not have the first specific function;
establishing a wireless connection with the terminal device; and
communicating with the terminal device by wireless communication using the network layer after establishing the wireless connection.

* * * * *